United States Patent
Leblanc et al.

(10) Patent No.: US 7,382,771 B2
(45) Date of Patent: Jun. 3, 2008

(54) MOBILE WIRELESS HOTSPOT SYSTEM

(75) Inventors: Larry Leblanc, New Westminster (CA); Kirk Moir, New Westminster (CA); Eddie Ho, Burnaby (CA)

(73) Assignee: In Motion Technology, Inc. (CA)

( * ) Notice: Subject to any disclaimer, the term of this patent is extended or adjusted under 35 U.S.C. 154(b) by 1034 days.

(21) Appl. No.: 10/386,691

(22) Filed: Mar. 13, 2003

(65) Prior Publication Data
US 2004/0179512 A1    Sep. 16, 2004

(51) Int. Cl.
*H04L 12/66* (2006.01)
*H04Q 7/24* (2006.01)
*H04Q 7/00* (2006.01)

(52) U.S. Cl. .................... 370/352; 370/338; 370/328

(58) Field of Classification Search ............. 370/352, 370/338, 328
See application file for complete search history.

(56) References Cited

U.S. PATENT DOCUMENTS

| | | |
|---|---|---|
| 5,953,504 A | 9/1999 | Sokal et al. |
| 2002/0073240 A1* | 6/2002 | Kokkinen et al. .......... 709/249 |
| 2002/0087335 A1 | 7/2002 | Meyers et al. |
| 2002/0191572 A1 | 12/2002 | Weinstein et al. |
| 2002/0191575 A1 | 12/2002 | Kalavade et al. |
| 2003/0003933 A1 | 1/2003 | Deshpande et al. |
| 2003/0112789 A1* | 6/2003 | Heinonen et al. .......... 370/349 |
| 2004/0199506 A1* | 10/2004 | Shaffer et al. ................ 707/6 |

* cited by examiner

*Primary Examiner*—William J Deane
(74) *Attorney, Agent, or Firm*—Vermette & Co.; Clifford W. Vermette; Denis R. O'Brien

(57) ABSTRACT

The invention relates to wireless Internet access points, and in particular to providing a mobile wireless access point for use with high-speed wireless devices. In particular, the system allows client devices configured for short-range, high-speed wireless Internet access to use said system to access the Internet while in a mobile environment, such as a passenger vehicle.

19 Claims, 10 Drawing Sheets

MOBILE WIRELESS HOTSPOT SYSTEM

FIELD OF INVENTION

The invention relates to wireless Internet access points, and in particular to providing a mobile wireless access point for use with high-speed wireless devices.

BACKGROUND OF INVENTION

Telecommunications technology has advanced dramatically in recent history. The era of cost effective mobile data connectivity, "anytime, anywhere" is rapidly approaching. With the growing popularity of the Internet and increasing mobility demands from end users, there has recently been increased interest in wireless public Internet access.

Public Internet access (e.g. Internet Café) has been around for many years. In the last couple of years, a new wireless data technology based on the IEEE 802.11 standard has been gaining momentum. Of particular interest is the deployment of 802.11-based access points—so called "Hotspots"—in public spaces, e.g. coffee shops, hotels, conference centers, and airports. Users with client devices such as laptops and personal digital assistants (PDAs) use an 802.11 network interface card that enables them to connect to the Internet without any physical cables. Once an association is established with the Wireless LAN (WLAN) Access Point (AP) or Hotspot, the user is able to surf the Internet as if they were on a LAN.

The existing Hotspots provide good Internet connectivity. The major challenge with this type of wireless solution is coverage. The 802.11 standard makes use of an unlicensed frequency spectrum and is therefore limited to low power transmissions. As a result, a typical Hotspot has a range of no more than 150 feet indoors and 1000 feet outdoors under ideal conditions. Even with large companies such as T-Mobile planning to install thousands of these Hotspots in the coming years, it will be very difficult to achieve sufficient coverage throughout a city to satisfy a large population of mobile workers.

To address the need for wide area wireless coverage, many cellular operators have been deploying new generation (known as 2.5G or 3G) wireless data networks. For example, the PCS Vision network from Sprint PCS is already providing substantially improved performance over previous generations of wireless technology. With speeds averaging 50-70 kbps and peaking at 144 kbps the PCS Vision network is much slower than its 802.11 counterpart but has the advantage of a large coverage area and support for vehicular mobility (e.g. 0-300 km/h). 3G networks provide a service that is closer to the "anytime, anywhere" objective.

There are drawbacks with 3G networks, chief among them being cost. 3G interface cards are expensive and so are the associated service plans. There are also several competing and evolving standards (1xRTT, 1xEV-DO, 1xEV-DV, GPRS, EDGE, etc.). A given interface card typically supports only one of these standards, the consumer is faced with a difficult decision, compounded by the knowledge he will likely have to upgrade to yet another expensive option within 18-36 months. High cost, confusing choices and poor performance relative to home Internet services such as DSL and cable modems all inhibit the wide acceptance of 3G.

Today, ground transportation is a part of nearly everyone's life. Be it airport transfers, customer visits, or daily commuting, more and more of the workforce is becoming mobile. Mobile workers are continually looking for cost effective solutions that allow them to stay in touch with their customers, co-workers, suppliers and shareholders electronically using standard computer equipment while "stuck" in transit using public transportation including limousines, taxis, buses, ferries or trains.

It is an object of this invention to provide a mobile wireless hotspot that allows client devices equipped with short-range wireless Internet capability (e.g. 802.11) to access the Internet from a mobile vehicle through a long-range wireless Internet system (e.g. a 3G network).

SUMMARY OF INVENTION

The present invention integrates a short-range wireless Hotspot, such as an 802.11-compatible hotspot, with the mobility of long-range wireless networks, such as 3G into a Mobile Hotspot System (MHS). The MHS includes a short-range wireless (WLAN) access point, a long-range wireless (WAN) Internet interface, and a Local Area Network (LAN) router to handle communications and features of the MHS.

The MHS provides wireless Internet connectivity to an end user with a client device configured for short-range wireless Internet access while in a mobile environment, such as a limousine.

The LAN router may further include transparent in-line data caching to improve an end user surfing experience and optimize access to popular web sites. This caching may also include pre-loading domain name service (DNS) results at system boot time to optimize host name lookups.

The MHS may further include a wireless WAN connection manager to monitor the state of the WAN connection and re-establishes it when necessary to ensure continuous Internet connectivity.

The MHS can also include content stored locally on the MHS instead of being retrieved over the WAN Internet connection. Such content can be retrieved by the user much faster than via the WAN. Such content may include, but not be limited to, advertising, local tourist information, and audio/video entertainment. The local content can be tailored to the user based on demographic information obtained directly or indirectly (e.g. by monitoring activity) from the user.

The MHS can include an integrated Operations Support System (OSS) for use with multiple MHS units. The OSS provides proactive monitoring and control of all deployed MHS units via the Internet. The MHS cache systems can be further optimized based on overall usage statistics collected by the OSS from all deployed MHS units.

The invention additionally includes a method of providing a mobile wireless hotspot by installing a mobile wireless hotspot system as described above into a vehicle for use by client devices in the vehicle. The method may also using an OSS to coordinate and share information between multiple mobile hotspots.

BRIEF DESCRIPTION OF THE DRAWINGS

The invention itself both as to organization and method of operation, as well as additional objects and advantages thereof, will become readily apparent from the following detailed description when read in connection with the accompanying drawings.

DETAILED DESCRIPTION OF THE INVENTION

Figure 1:
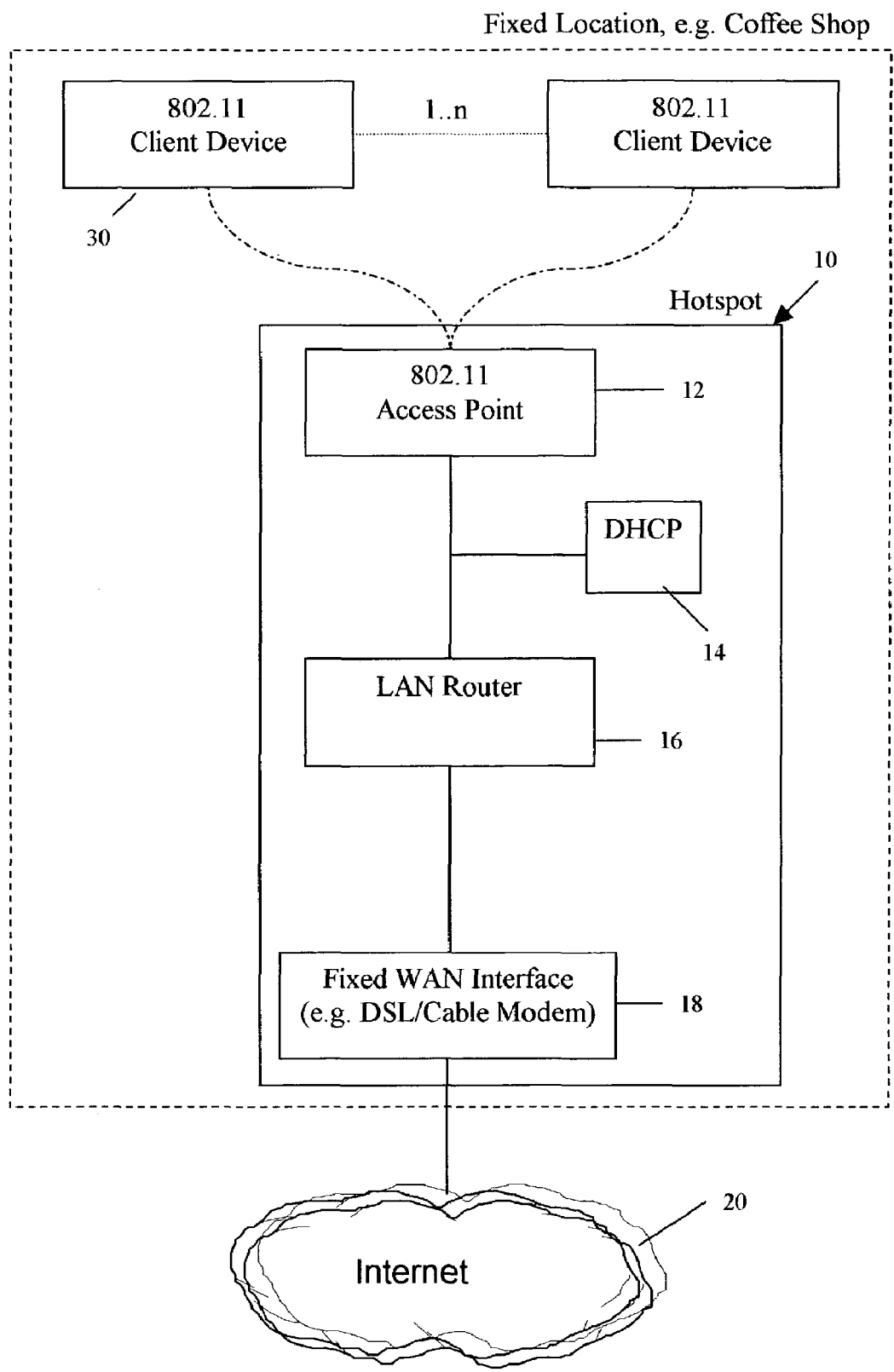
FIG. 1 is an architecture diagram of a typical prior art wireless 802.11 Hotspot.

Referring to FIG. 1, there is illustrated within a typical architecture for a prior art Hotspot 10. The range of application of the prior art Hotspot 10 is limited to a small area since the WAN interface 18 is fixed in location.

In the prior art system, an 802.11 Access Point 12 accepts connections from a plurality of 802.11 client devices 30. Coupled to an output of the 802.11 Access Point 12 a DHCP (Dynamic Host Configuration Protocol) module 14 assigns IP (Internetworking Protocol) addresses and configures other network settings (e.g. name servers, gateways) for the client devices 30 when they connect to the access point 12. The LAN Router 16 directs traffic from the access point 12 to the Internet 20 via the fixed WAN interface 18. The WAN interface 18 is typically a DSL or cable modem providing high-speed Internet access.

Figure 2:
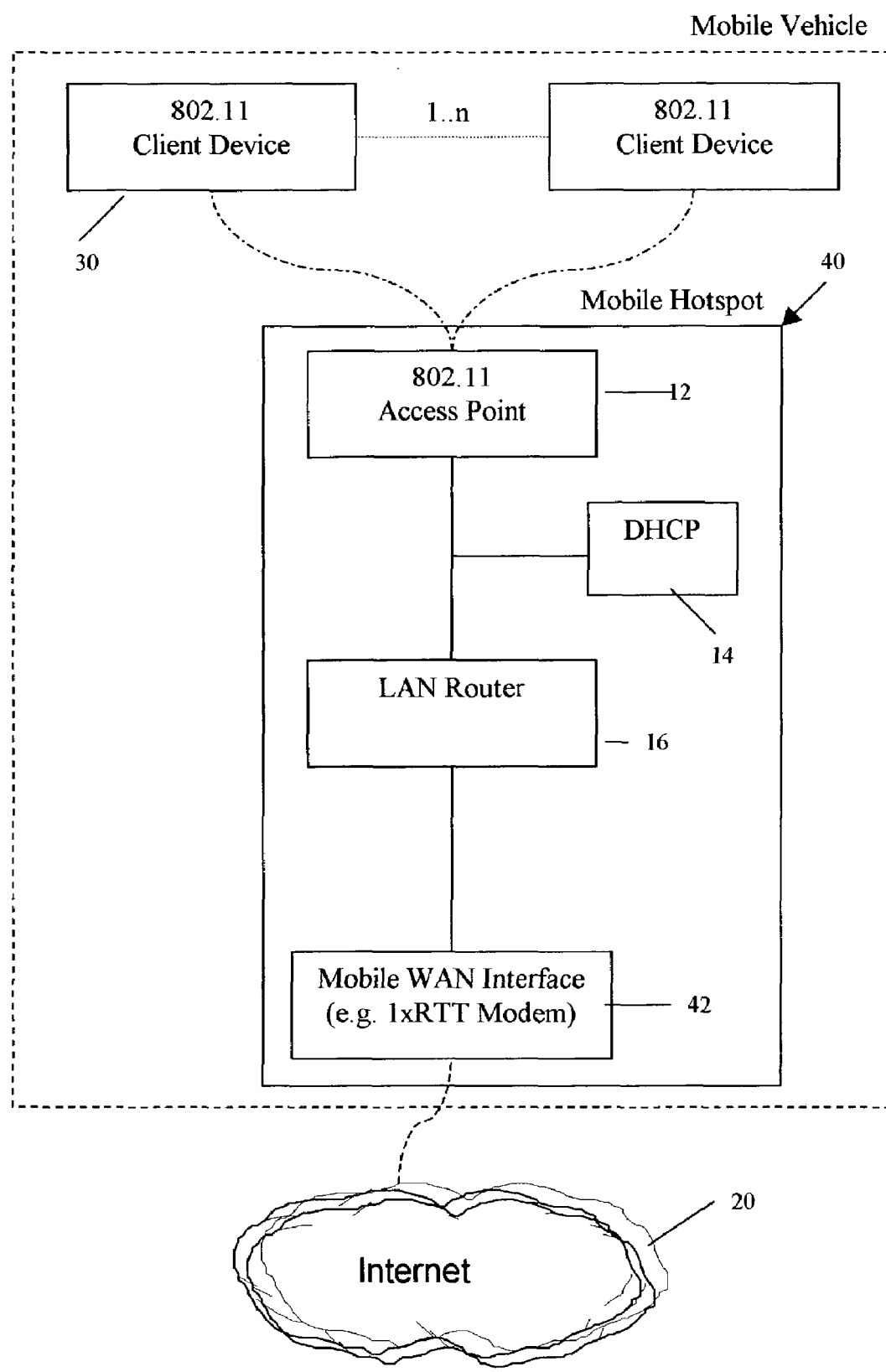
FIG. 2 is an architecture diagram for a Mobile Hotspot System (MHS) according to the present invention.

Referring to FIG. 2, a Mobile Hotspot System (MHS) 40 is shown in which Client devices 30 connect to the MHS 40 by an 802.11 access point 12 in the same fashion as they do to a standard hotspot. The key difference is the Internet connection is established via a mobile WAN interface 42 using a mobile WAN service such as 1xRTT or GPRS. The Mobile WAN Interface 42 allows the MHS 40 to be deployed in a moving vehicle (not shown). Typically, the MHS 40 would be installed in vehicles such as limousines and luxury vehicles given the current costs. However, as the costs for the hardware decrease over time, the MHS 40 will be installed in private vehicles as well as taxis, commuter buses, light rail, passenger and motor vehicle ferries and other mass transit systems.

Figure 3:
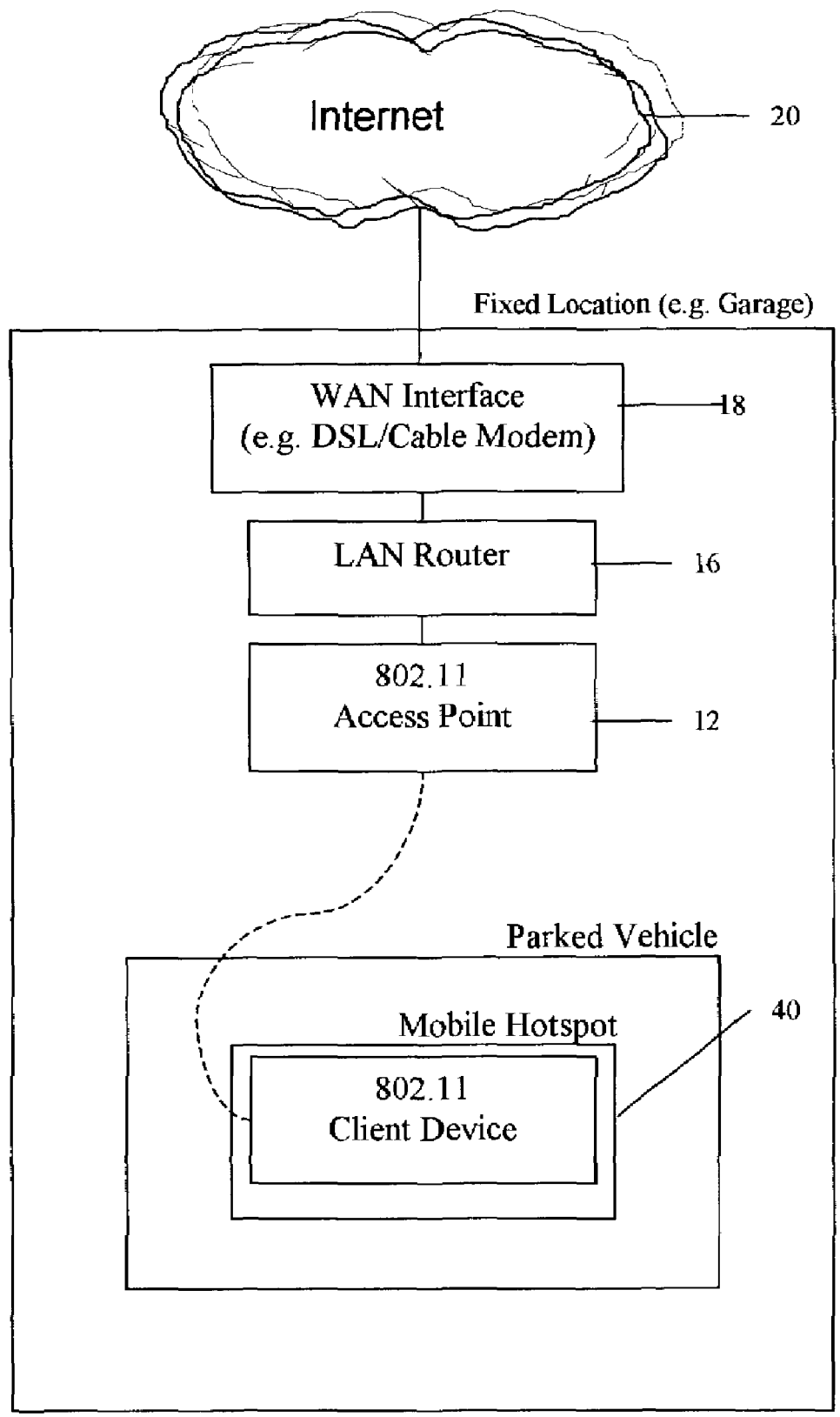
FIG. 3 is an architecture diagram of an MHS accessing a local fixed Hotspot.

FIG. 3 illustrates an alternative usage for the MHS 40, in which the MHS 40 acts as an 802.11 Client device when the vehicle is parked in proximity to an 802.11 access point 12. The MHS 40 can then use the relatively high speed 802.11 data link to update local content stored on the MHS 40. Unlike a conventional hotspot, the MHS 802.11 interface requires the ability to switch between client and access point modes.

Figure 4:
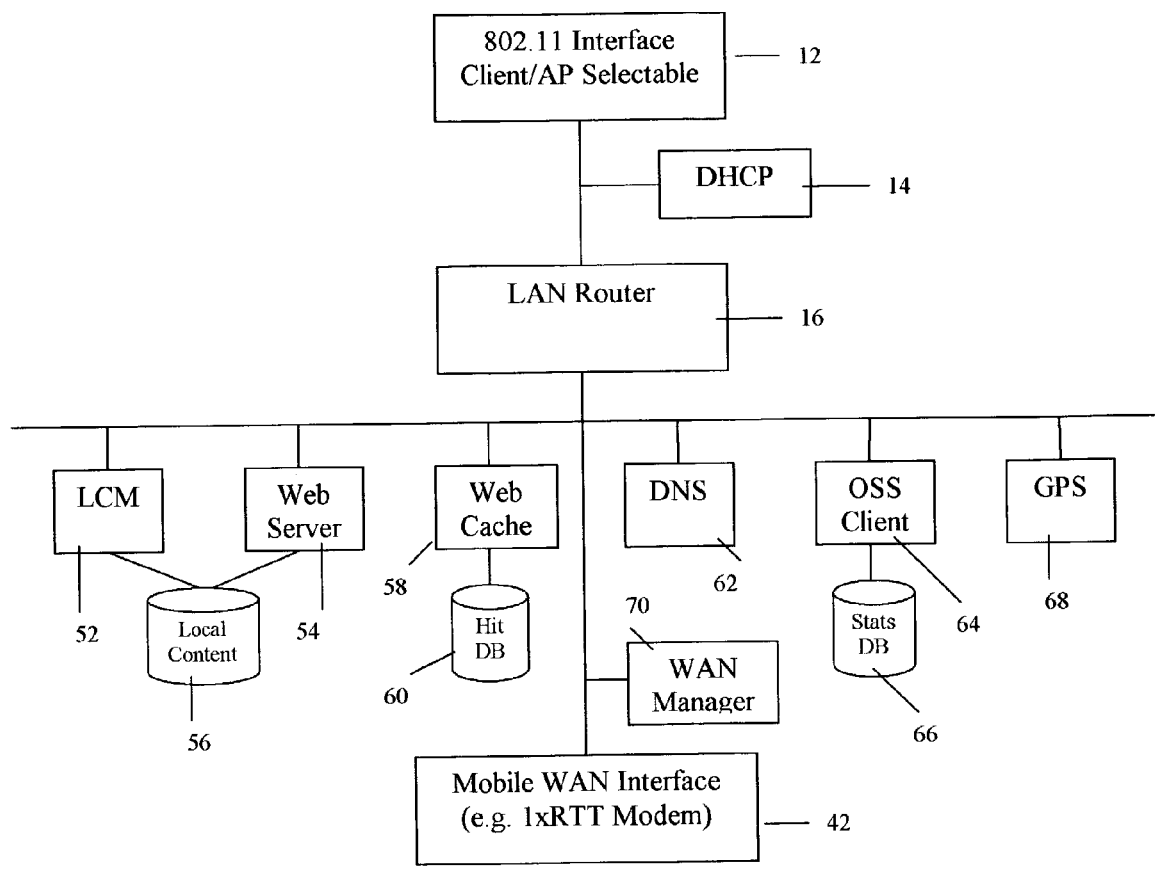
FIG. 4 is a functional block diagram of an MHS.

The functional block diagram of the MHS 40, illustrated in FIG. 4, consists of the 802.11 interface 12 which is capable of acting as either a client device or an access point to support both operational modes as shown in FIGS. 2 and 3. The DHCP module 14 assigns IP addresses and configures other network information (name servers, gateways) for client devices 30 when they connect to the MHS 40. The DHCP module 14 performs no function when the MHS 802.11 interface 12 is operating as a client device.

The LAN Router 16 controls access to the MHS 40. Newly connected clients are prevented from accessing the Internet 20 immediately as all Hypertext Transfer Protocol (HTTP) requests are intercepted and redirected to the local web server module 52 for user authentication. Once authentication is complete, all HTTP requests are transparently redirected to the local Web Cache module 58, while all other traffic from the authenticated client is passed directly to the Internet 20.

The LAN Router 16 also performs Network Address Translation (NAT). This allows all client devices 30 to share a single external Internet address. It also acts as a security measure, preventing hostile external entities from establishing connections to MHS client devices 30. The Web Cache module 58 is a performance optimization feature. Each HTTP request is analyzed to see if the requested data exists in the local cache 58. If a match or "hit" is found, the data is returned to the user directly from the cache 58 at much higher speeds than if the data had to be retrieved from the Internet 20.

The Web Server module 54 handles user authentication and provides local content 56. Local content 56 may include but not be limited to advertising, audio/video entertainment, local news and traffic data. The Local Content Module (LCM) 52 customizes the information presented to the user from the local web server module 54. The LCM 52 gathers position information from the onboard GPS module 68, if present, in order to tailor advertising, news and traffic information based on the location of the vehicle. The LCM 52 also analyzes web surfing patterns from the Web Cache module 54 in order to tailor advertising based on the interests of the customers using the service. The LCM 52 also detects when the vehicle is parked in proximity to an 802.11 access point and switches the MHS 40 into client mode, downloading bulky new content over the high speed link from the central OSS (operations support system) 80.

The DNS module 62 handles domain name resolution requests. These requests are issued by client devices 30 in order to translate human-friendly domain names (e.g. 'www.google.com') into their numerical equivalents (e.g. 123.456.789.555). The DNS module 62 resolves these requests via the slow WAN link on the first request but then caches the results so that subsequent requests are returned from directly from the DNS cache 60.

The WAN Manager module 70 monitors the state of the WAN connection. Like cell phones, the mobile WAN connection occasionally loses signal strength and drops the connection. The WAN manager 70 senses these dropouts and automatically re-initiates the call. The WAN manager 70 also sends a periodic beacon to the Web to confirm the WAN connection (see flowchart in FIG. 10). These operations dramatically improve the user experience by minimizing the outages the user sees. The WAN manager 70 also reports the state of the connection to the local content manager (LCM) 52 so that the user can see when they do and do not have Internet connectivity.

The Geographical Positioning Service (GPS) module 68 is a satellite-based system that can pinpoint the location of the MHS 40. This position information is logged with the OSS client 64 for vehicle tracking purposes and is also relayed to the Local Content Manager 52 for customization of local content.

The OSS client module 64 is an optional module installed when the MHS 40 is to be managed by a central OSS. It collects MHS operational statistics and makes them available to the central OSS via the Internet 20. In addition, the OSS client 64 provides administrative access to the unit via the Internet 20 so that basic maintenance can be performed without physically accessing the MHS 40.

Figure 5:
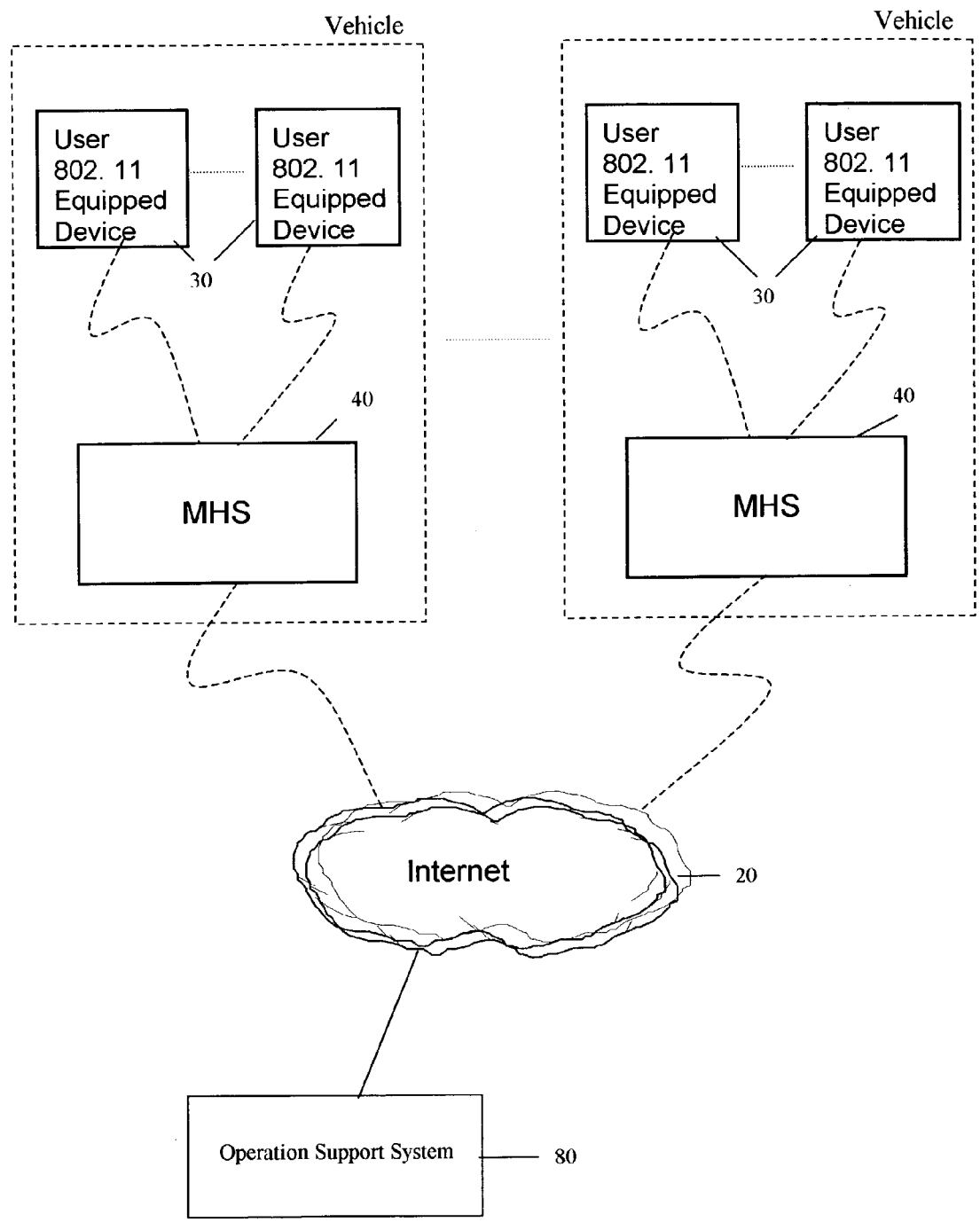
FIG. 5 is an architecture drawing of a distributed MHS system including multiple MHS units and a central Operations Support System (OSS)

FIG. 5 illustrates architecture for the connection of multiple MHS units 40 to the Internet 20 and management of the MHS units 40 from a central OSS 80 via the Internet 20.

Figure 6:
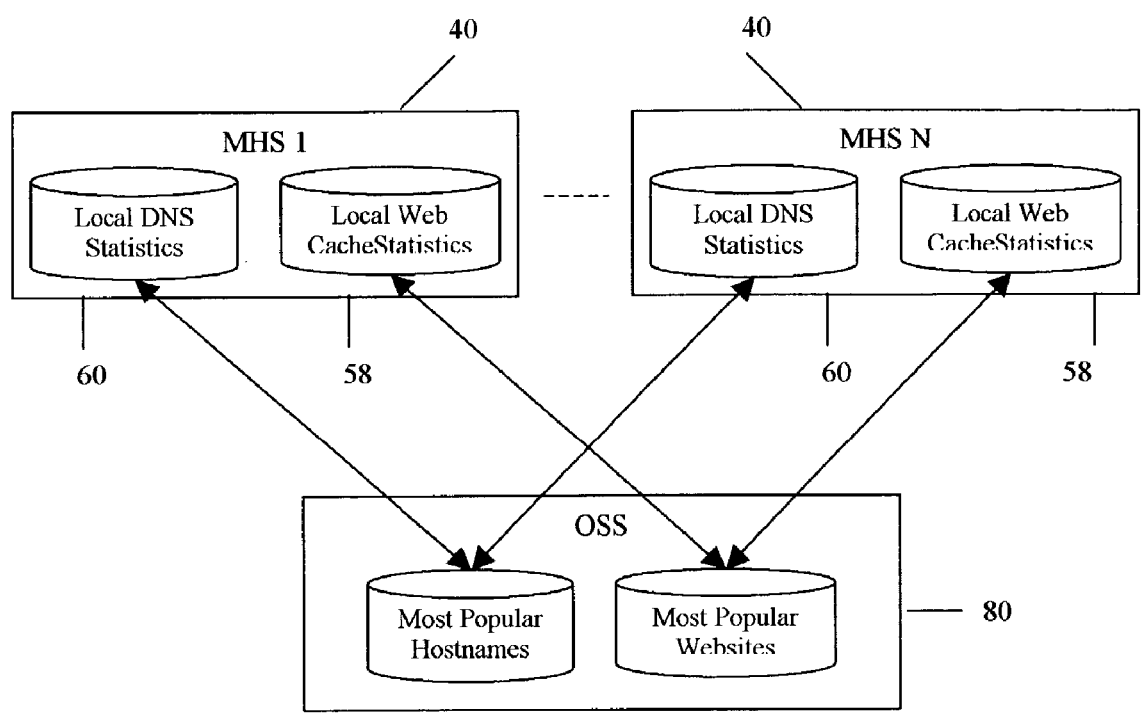
FIG. 6 is a block diagram illustrating the principles of aggregate web and DNS caching in an MHS.

FIG. 6 illustrates the aggregate web and DNS caching mechanisms for a network of MHS units 40. Each MHS unit 40 reports its local web cache 58 and DNS statistics 60 to the central OSS 80, which consolidates the information into lists of the most popular web sites and hostnames. During idle periods, the MHS units 40 retrieve these global popularity lists and update their web 58 and DNS 60 caches accordingly using the pre-loading logic shown in FIG. 8 and FIG. 9. The priority between DNS pre-loading and web page pre-loading can be set either by the individual MHS 40 or from the OSS 80.

Figure 7:
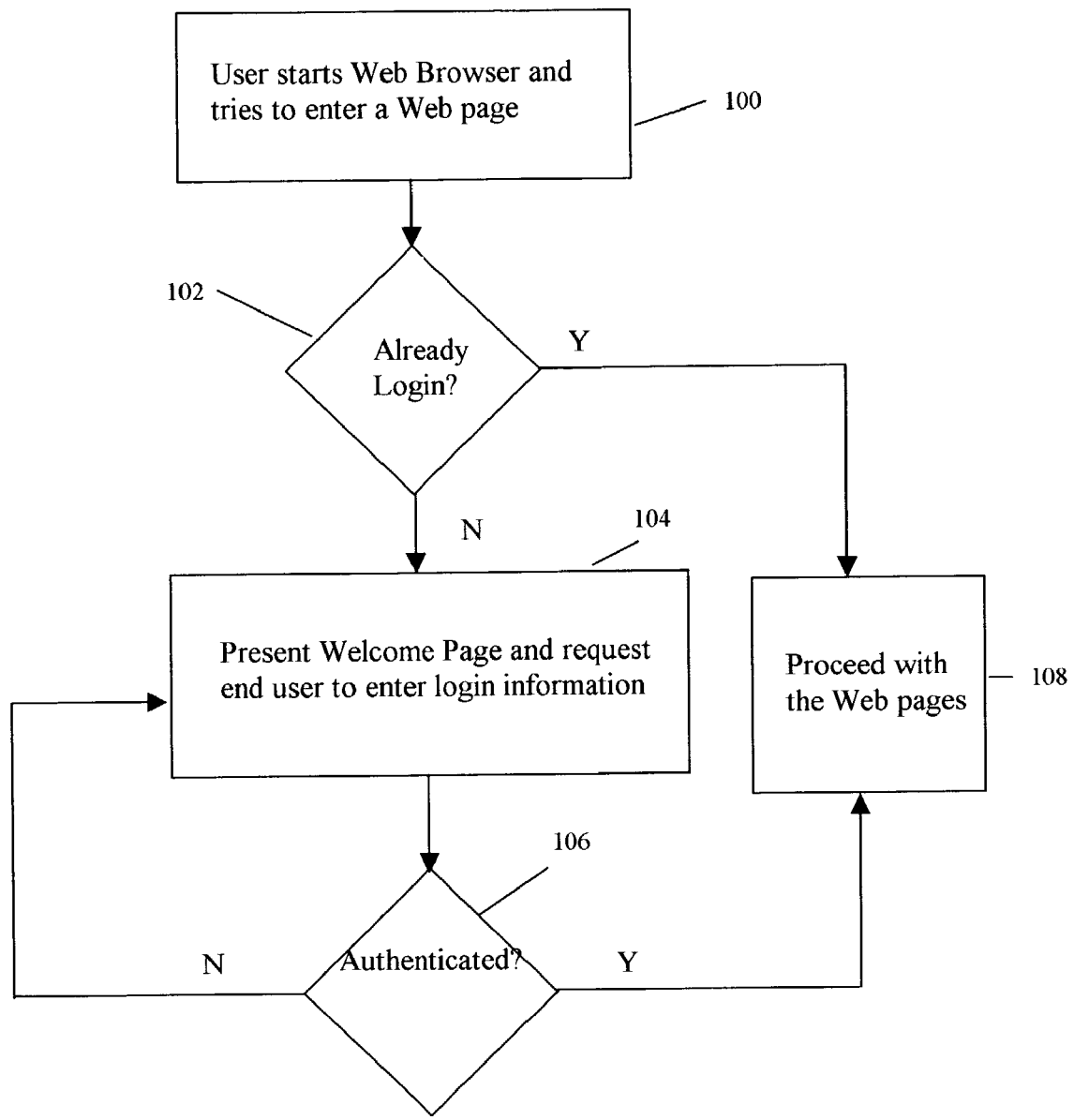
FIG. 7 is a logic diagram illustrating the process of authenticating the end user for the MHS.

FIG. 7 illustrates the authentication procedure followed when a client device 30 connects to the MHS 40. The client device first 100 launches its Web Browser application and attempts to load a web page. The web server module 52 then checks 102 to see if the user of the device is logged in to the system. If the user is logged in, then the web page is loaded 108. If the user is not logged in, then a welcome page with a login information request (i.e. user ID and password) is presented 104. The login information is authenticated 106 and then further user requests are allowed to proceed to the Internet. Otherwise, the welcome page 104 is re-displayed requesting the user to enter the login information again.

Figure 8:
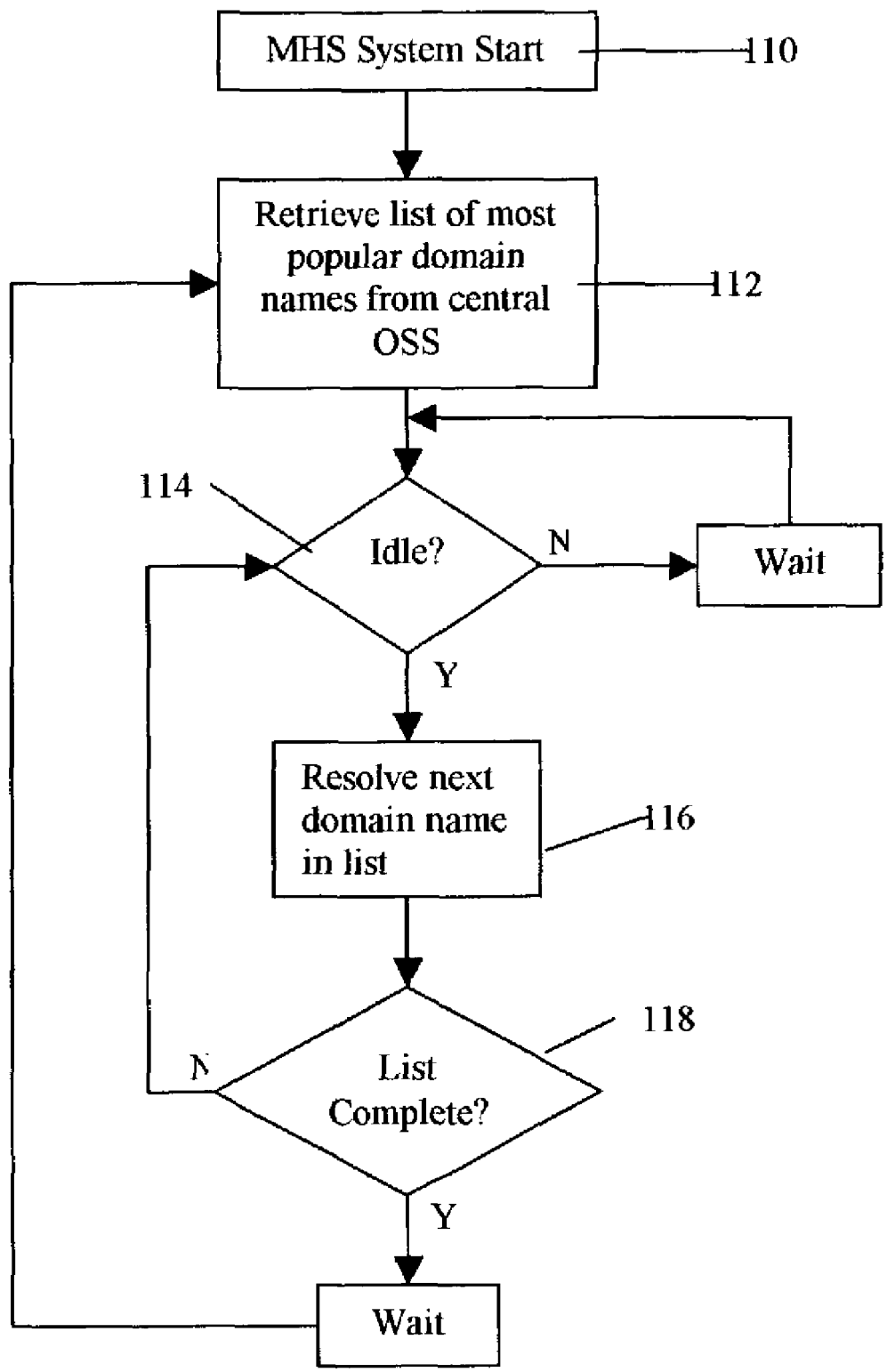
FIG. 8 is a logic diagram illustrating the process of pre-loading the DNS cache in the MHS based on aggregate popularity statistics from all MHS units.

The DNS pre-loading algorithm is shown in the flowchart in FIG. 8. At this system start-up (110) the list of the most popular domain names is downloaded (112) from the central OSS 80. During the idle cycle (114), if the system is idle, the next domain name on the list has its DNS address resolved (116). The list is checked for remaining domain names (118) and the process continues during MHS idle periods until the entire list has been resolved.

Figure 9:
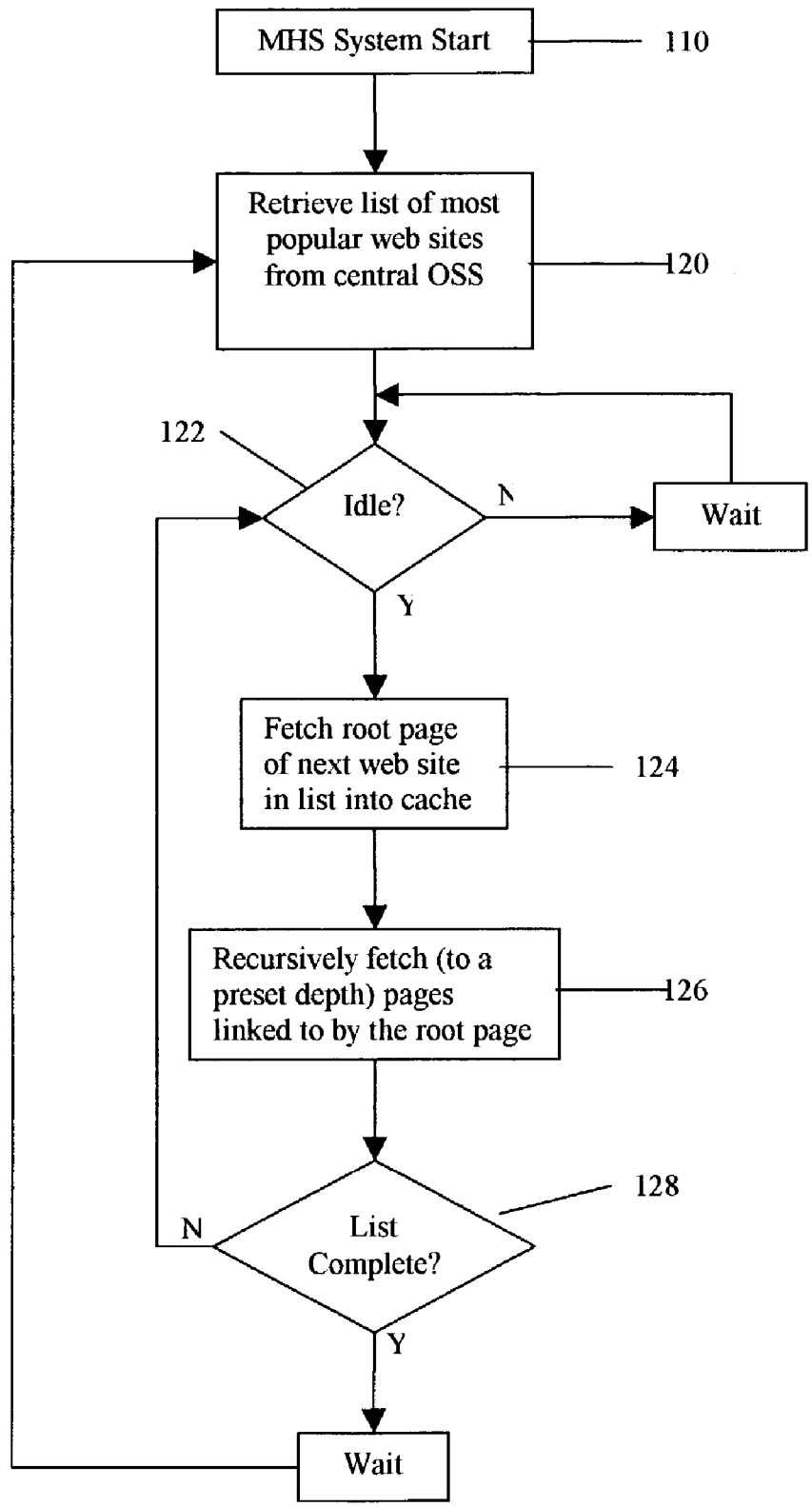
FIG. 9 is a logic diagram illustrating the process of pre-loading the Web Cache in the MHS based on aggregate popularity statistics from all MHS units.

The web site pre-loading algorithm is shown in the flowchart in FIG. 9 and is similar to the DNS algorithm. After start-up (110) the list of most popular web sites is downloaded from the central OSS (120). During the idle cycle (122), if the system is idle, the root page of the next web site on the list is downloaded into the web cache 58 (124). Linked pages off the root page of the website are also fetched (126) up to a preset depth from the root page. This preset depth can be set to zero to cache only the root pages. The list is checked for remaining web sites (128) and the process continues during MHS idle periods until the entire list has been downloaded to the web cache 58.

Figure 10:
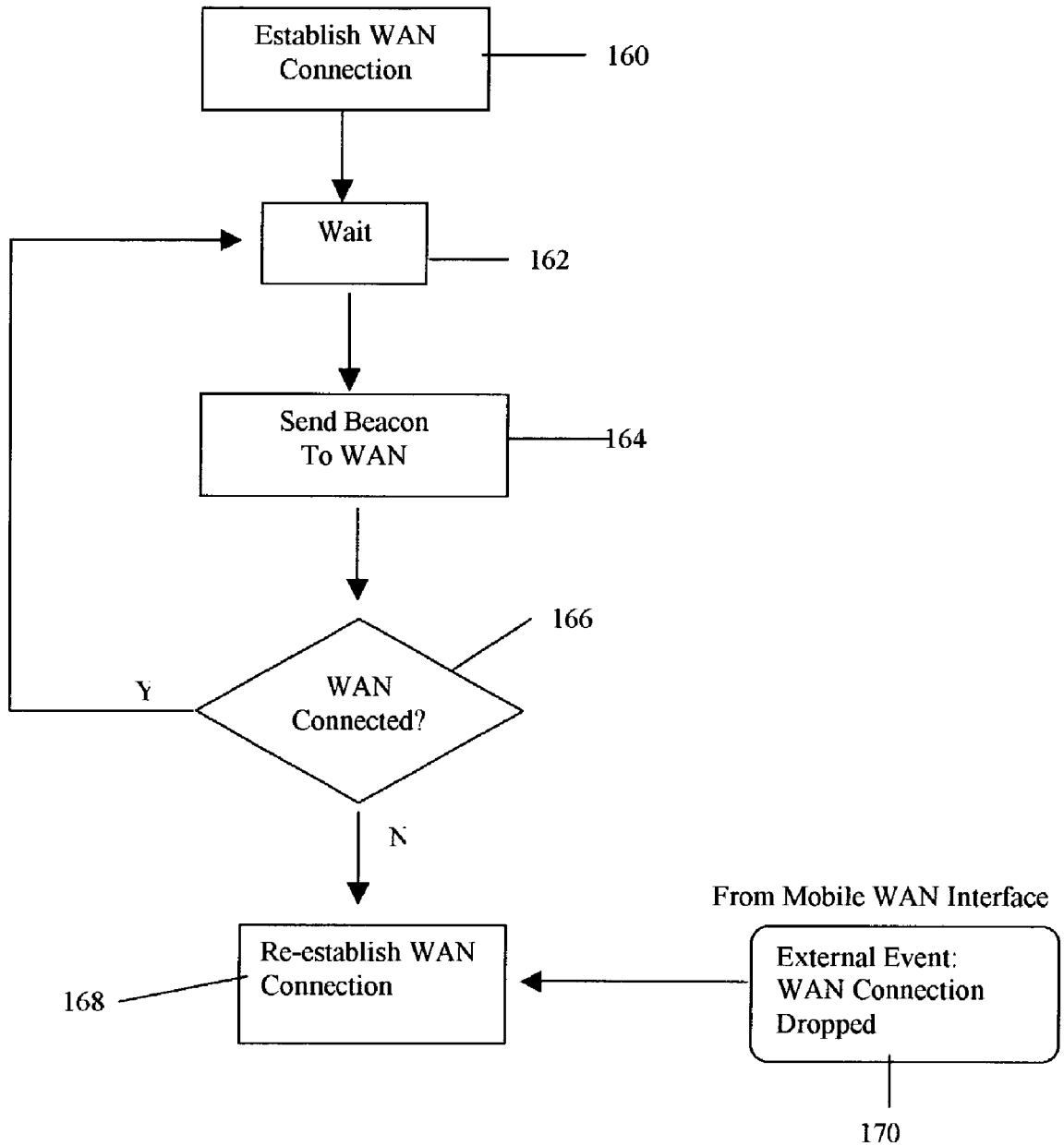
FIG. 10 is a logic diagram illustrating the WAN beacon process of the WAN Manager.

The flowchart in FIG. 10 shows the WAN manager beacon process. Once the WAN connection is established (160) the system waits for a preset period (162) before sending a beacon to the WAN to verify the connection status (164). If the WAN is connected (166), the system returns to the wait state (162). If the WAN is not connected (166), the system attempts to re-establish the WAN connection (168). The WAN manager will also attempt to re-establish the WAN connection whenever it receives a signal 170 from the WAN interface 42 indicating that the WAN connection is down.

While the above description of the MHS 40 is based on 802.11 and 3G wireless Internet standards, the system can be readily modified to be compatible with other short-range or long-range wireless standards, such as 2.0G or 2.5G (long-range). The MHS 40 is also fully upgradeable with advances in the wireless field, such as the proposed 4G network from IPWireless.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

We claim:

1. A mobile wireless hot spot system, comprising:
   a) a short-range, high-speed wireless access point operative to communicate with short-range client devices;
   b) a long-range, wireless Internet access interface operative to communicate with the Internet; and
   c) a Local Area Network (LAN) routing system managing the data path between said wireless access point and said Internet access interface,
   wherein said mobile wireless hotspot system is a stand-alone system that enables client devices configured for short-range, high-speed wireless Internet access to use said mobile wireless hotspot system to access the Internet without the need to access an external service controller server.

2. The system of claim 1, wherein said short-range, high-speed wireless access point uses 802.11 as a wireless standard.

3. The system of claim 1, wherein said hotspot system is integrated into a vehicle such that passengers in said vehicle are capable of accessing the Internet using said client devices.

4. The system of claim 1, further comprising local content module that stores content that can be accessed by said client devices directly through said high-speed access point.

5. The system of claim 1, wherein said LAN routing system includes a Geographical Positioning Service (GPS) locator to provide location information to said system and to said client devices, to enable dynamic tailoring of local content for services.

6. The system of claim 1, wherein said LAN routing system includes a website cache that allows said client devices to access information stored in said website cache directly through said high-speed access point.

7. The system of claim 4, wherein said system includes a short-range, high-speed wireless access interface to enable said system to download updates to said local content module using a fixed high-speed wireless access point.

8. The system of claim 1, further including an operation support system (OSS) module to monitor and share information with other mobile hotspot systems.

9. A method of providing a mobile wireless hotspot system for client devices requiring a short-range wireless access point, comprising:
   a) installing said mobile wireless hotspot system in a vehicle, said mobile wireless hotspot system including:
      i) a short-range high-speed wireless access point;
      ii) a long-range, wireless Internet access interface; and
      iii) a Local Area Network (LAN) routing system managing the data path between said wireless access point and said Internet access interface,
   wherein said mobile wireless hotspot system is a stand-alone system that enables said client devices configured for short range, high speed wireless Internet access to use said mobile wireless hotspot system to access the Internet, both while said vehicle is in motion and when said vehicle is stationary, without the need to access an external service controller server.

10. The method of claim 9, further including providing an operation support system (OSS) for monitoring and sharing information between multiple mobile wireless hotspot systems.

11. The method of claim 10, wherein said OSS additionally compiles a list of frequently accessed domains and websites the information about which has been dynamically cached based on user activity, said list based on using data received from said multiple hotspot systems and said list can be downloaded into a local content module by individual ones of said hotspot systems.

12. The method of claim 11, wherein said list can further be used to pre-load websites and domains into a web cache on said multiple hotspot systems at startup.

13. The method of claim 9, further including providing a local content module in said hotspot system such that the content in said local content module can be accessed directly via said high-speed wireless access point.

14. The method of claim 10, wherein said mobile hotspot system includes a Geographical Positioning Service (GPS) locator to provide location information to client devices accessing said hotspot system and to said OSS, to enable dynamic tailoring of local content for services.

15. A network of mobile wireless hotspots, comprising:
a) a plurality of mobile wireless hotspot systems installed in vehicles, each mobile wireless hotspot system including:
  i) a short-range high-speed wireless access point;
  ii) a long-range, wireless Internet access interface; and
  iii) a Local Area Network (LAN) routing system
connecting said wireless access point and said Internet access interface, wherein said mobile wireless hotspot system enables passengers in said vehicle to use said client devices to access the Internet both while said vehicle is in motion and when said vehicle is stationary and b) an operation support
system (OSS) operative to monitor and share information between said mobile hotspot systems on said network.

16. The network of claim 15, wherein said OSS compiles a list of frequently accessed domains and websites using data received from said multiple hotspot systems and said list can be downloaded into a local content module by individual ones of said hotspot systems.

17. The network of claim 16, wherein said list can further be used to pre-load websites and domains into a web cache on each of said hotspot systems at startup.

18. The system of claim 1, including a WAN Interface providing high-speed Internet access, a long range wireless Internet access interface (WAN) manager coupled to said WAN interface, and monitoring a WAN connection of said WAN Interface in order to provide a continuous connection to the Internet.

19. The method of claim 9, including monitoring a connection of a WAN Interface to the Internet to detect any loss of connection and then re-establishing the connection whenever it is lost.

* * * * *